(12) United States Patent
Yonekura

(10) Patent No.: US 8,194,352 B2
(45) Date of Patent: Jun. 5, 2012

(54) MANUFACTURING TWISTED BASE PLATE OF HEAD SUSPENSION FOR REDUCING OFF-TRACK ERRORS

(75) Inventor: Ryosuke Yonekura, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 349 days.

(21) Appl. No.: 12/462,445

(22) Filed: Aug. 4, 2009

(65) Prior Publication Data
US 2010/0033876 A1 Feb. 11, 2010

(30) Foreign Application Priority Data

Aug. 5, 2008 (JP) .................................. 2008-202280

(51) Int. Cl.
G11B 5/55 (2006.01)
H04R 31/00 (2006.01)

(52) U.S. Cl. ................. 360/244.5; 360/265.9; 29/603.03

(58) Field of Classification Search .... 360/244.2–25.74, 360/240–294.7; 29/603.01–603.27
See application file for complete search history.

(56) References Cited

U.S. PATENT DOCUMENTS

| 6,154,952 | A  | * | 12/2000 | Tangren | ..................... | 29/603.04 |
| 7,542,239 | B2 | * | 6/2009 | Resh et al. | ................. | 360/244.3 |
| 7,855,857 | B2 | * | 12/2010 | Hayakawa et al. | ........... | 360/266 |

FOREIGN PATENT DOCUMENTS

| JP | 6-150598 | 5/1994 |
| JP | 10-097773 | 4/1998 |
| JP | 2002-313041 | 10/2002 |
| JP | 2008-010063 | 1/2008 |

* cited by examiner

Primary Examiner — Allen Heinz
(74) Attorney, Agent, or Firm — Jordan and Hamburg LLP

(57) ABSTRACT

A head suspension 15 includes a base plate 27, a load bend 35, a load beam 37, a flexure 39, and a slider 25 that are assembled together through several processes including a pressing process. In such a head suspension 15 that is a finished product in a conventional sense, a front end 30 of the base plate 27 is twisted so that the front end 30 inclines toward one of inner and outer circumferences of a disk-like recording medium 33. The twisting process is carried out before attaching the head suspension 15 to an arm 13 of a carriage to be installed in a hard disk drive. The head suspension 15 with the twisted front end 30 prevents off-track errors even when it is used for a multi-arm assembly involving a plurality of head suspensions.

8 Claims, 6 Drawing Sheets

MANUFACTURING TWISTED BASE PLATE OF HEAD SUSPENSION FOR REDUCING OFF-TRACK ERRORS

BACKGROUND OF THE INVENTION

1. Field of the Invention

The present invention relates to a head suspension for supporting a slider in a hard disk drive. In particular, the present invention relates to a method of simply and smoothly manufacturing a head suspension that is capable of suppressing off-track errors even when employed for a multi-arm assembly provided with a plurality of head suspensions.

2. Description of Related Art

A hard disk drive (HDD) incorporates a head suspension having a magnetic head slider (simply referred to as "slider") to write/read data in a noncontact manner with respect to a disk-like recording medium rotated in the hard disk drive. The hard disk drive must employ a measure to prevent a data read/write error caused by an off-track error that the slider deviates from a target track on the recording medium.

In the hard disk drive, the head suspension provided with the slider forms a head gimbal assembly (HGA) and the head gimbal assembly is attached to a front end of an arm. The arm is turned around a turn axis with a voice coil motor (VCM) to position the slider onto a target track on the recording medium. If the recording medium or the head gimbal assembly vibrates out of an allowable range during the positioning of the slider onto a target track, a relative position between the voice coil motor and the target track changes to cause an off-track error.

A related art to suppress the off-track error is disclosed in, for example, Japanese Unexamined Patent Application Publication No. 2008-10063. This related art proposes a disk drive including a head suspension to support a slider and an arm to connect the head suspension to a turn shaft that turns the arm to move the slider over a recording surface of a disk-like recording medium. The arm is twisted in a direction from the turn shaft to the slider toward an outer circumference of the recording medium, so that the arm may bend and vibrate in a direction inclined in a radial direction of the recording medium with respect to a normal extended from the recording surface of the recording medium.

According to the related art, the head suspension is inclined according to the twisted arm, and therefore, the direction of bend or vibration between the arm and the head suspension inclines with respect to the normal extended from the recording surface of the recording medium. This reduces a peak value of off-track displacement of the slider that is determined by a skew angle and a bend/vibration direction, thereby keeping a slider positioning accuracy.

The related art manufactures a head suspension-arm assembly (simply referred to as "arm assembly") by mechanically twisting the arm with a jig and attaching the head suspension to the arm, to reduce vibration components acting on the slider, as described in paragraph 0058 of the Japanese Unexamined Patent Application Publication No. 2008-10063. When manufacturing an arm assembly involving a plurality of arms according to the related art, arms other than an arm to be twisted interfere with the arm to be twisted, to hinder the twisting work. Namely, the twisting work of one arm must be carried out while avoiding the other arms. This makes the twisting work troublesome and increases the number of processes.

SUMMARY OF THE INVENTION

An object of the present invention is to provide a method of simply and smoothly manufacturing a head suspension that is capable of suppressing off-track errors even when employed for a multi-arm assembly involving a plurality of head suspensions.

In order to accomplish the object, an aspect of the present invention provides a method of manufacturing a head suspension that has a base plate to be attached to a carriage, a load beam whose base end is attached to a front end of the base plate, a flexure attached to a front end of the load beam, and a slider resiliently supported by the flexure so that the slider receives load from the load beam and floats above a disk-like recording medium when the recording medium is rotated in a disk drive in which the carriage and head suspension are installed. The method includes twisting the front end of the base plate so that the front end of the base plate inclines toward one of inner and outer circumferences of the disk-like recording medium.

This aspect of the present invention twists the front end of the base plate of the head suspension so that the front end of the base plate inclines toward one of the inner and outer circumferences of a disk-like recording medium when installed in a hard disk drive. Accordingly, a part of the head suspension on the front side of the front end of the base plate inclines according to the twisted front end of the base plate, and therefore, bend or vibration between the carriage and the head suspension inclines with respect to a normal extended from a recording surface of the recording medium.

This reduces a peak value of off-track displacement of the slider that is determined by a skew angle and a bend/vibration direction, thereby keeping a slider positioning accuracy. In connection with a skew angle in a standard HDD, inclining the front end of the base plate toward the outer circumference of a recording medium results in improving the off-track preventive effect. Depending on an arrangement of the slider and the specific vibration characteristic of an arm assembly, inclining the front end of the base plate toward the inner circumference of a recording medium improves the off-track preventive effect. In this case, it is preferable to incline the front end of the base plate toward the inner circumference of a recording medium. Twisting the front end of the base plate is easy to achieve even when manufacturing a multi-arm assembly because it is achievable without regard to arms of the multi-arm assembly.

Accordingly, the above-mentioned aspect of the present invention is applicable to simply and smoothly manufacture head suspensions for a multi-arm assembly capable of suppressing off-track errors.

BRIEF DESCRIPTION OF THE DRAWINGS

FIGS. 3A and 3B are perspective views illustrating a head suspension, in which FIG. 3A illustrates the head suspension before twisted and FIG. 3B illustrates the head suspension after twisted;

FIGS. 4A and 4B are perspective views illustrating a head suspension, in which FIG. 4A illustrates the head suspension before twisted and FIG. 4B illustrates twisting stress applying areas (illustrated with hatched lines) on the head suspension;

DETAILED DESCRIPTION OF EMBODIMENTS

Methods of manufacturing a head suspension according to embodiments of the present invention and head suspensions manufactured according to the methods will be explained in detail with reference to the drawings.

First, an arm assembly including head suspensions manufactured according to an embodiment of the present invention and a hard disk drive incorporating such an arm assembly will be explained.

Figure 1:
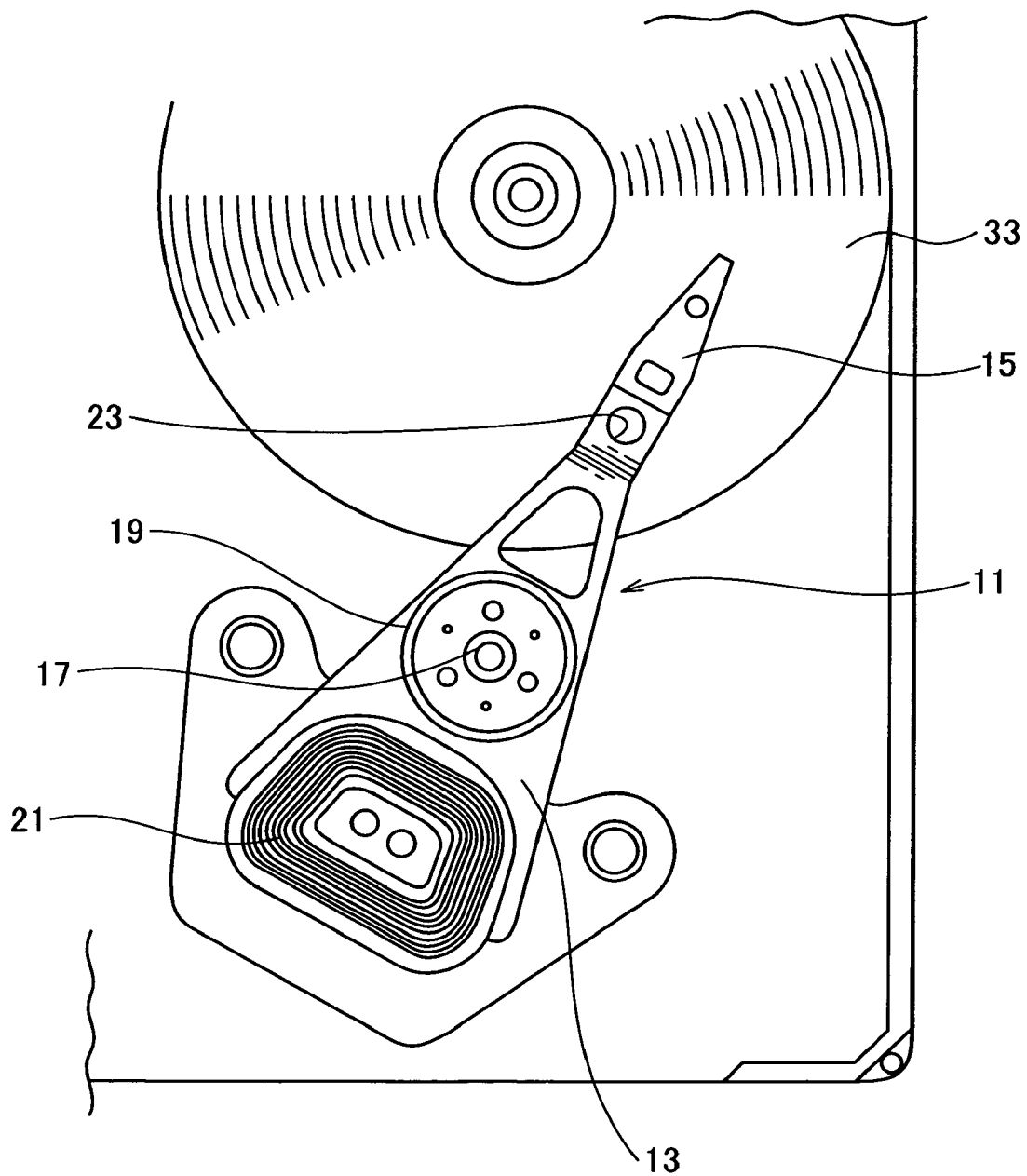
FIG. 1 is a plan view partly illustrating a hard disk drive in which an arm assembly is installed.
Figure 2:
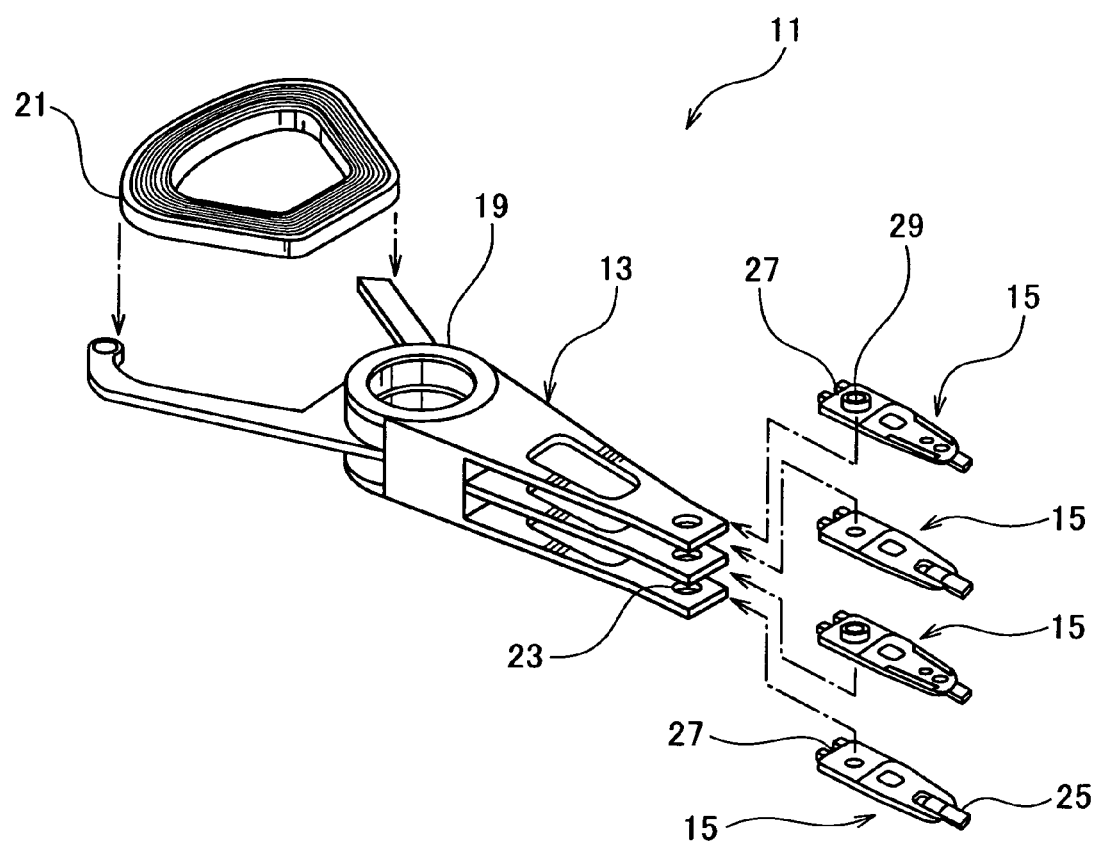
FIG. 2 is a perspective exploded view illustrating the arm assembly of FIG. 1.

FIG. 1 is a plan view partly illustrating a hard disk drive incorporating an arm assembly 11 and FIG. 2 is a perspective exploded view illustrating the arm assembly 11.

The arm assembly 11 of the example illustrated in FIGS. 1 and 2 is a multi-arm assembly including three arms 13 and three head suspensions 15 that are attached to front ends of the arms 13, respectively. The multi-arm assembly 11 is rotatably supported by a spindle 17 of a carriage. Each of the arms 13 has a base end attached to a rotary bearing 19 and voice coil motor (VCM) 21 and the front end having a joint hole 23.

Each of the head suspensions 15 has a front end provided with a slider 25 and a base end where a base plate 27 is laser-welded. The base plate 27 has a boss 29. When attaching the head suspension 15 to the arm 13, the boss 29 is engaged with the joint hole 23 of the arm 13 and a steel ball whose diameter is slightly larger than an inner diameter of the boss 29 is forcibly passed through the boss 29, so that the boss 29 and joint hole 23 are joined together.

In the hard disk drive in which the arm assembly 11 is installed, a drive current is passed to the voice coil motor 21 so that the voice coil motor 21 generates torque. The torque turns the arm assembly 11 around the spindle 17, to move and position the slider 25 onto a target track on a recording medium 33.

Figure 3A:
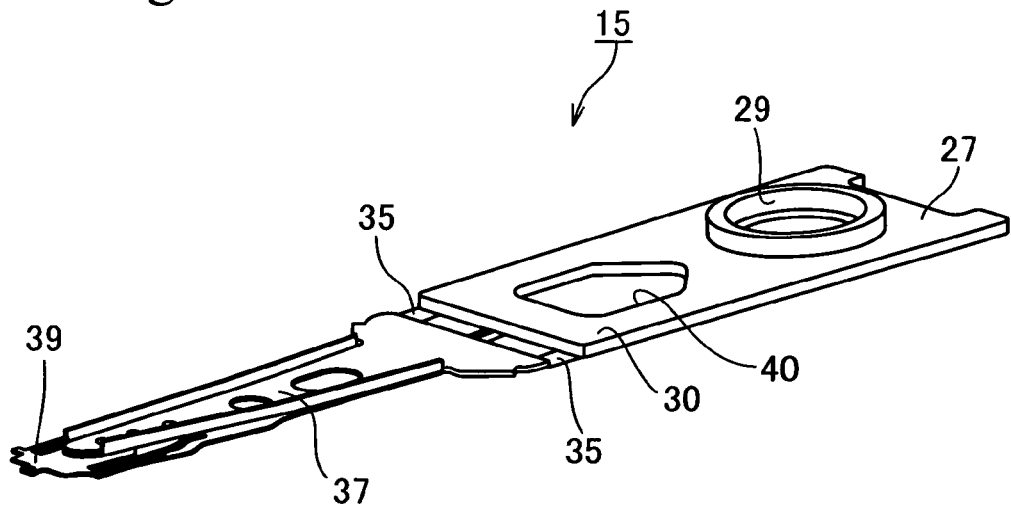
Figure 3B:
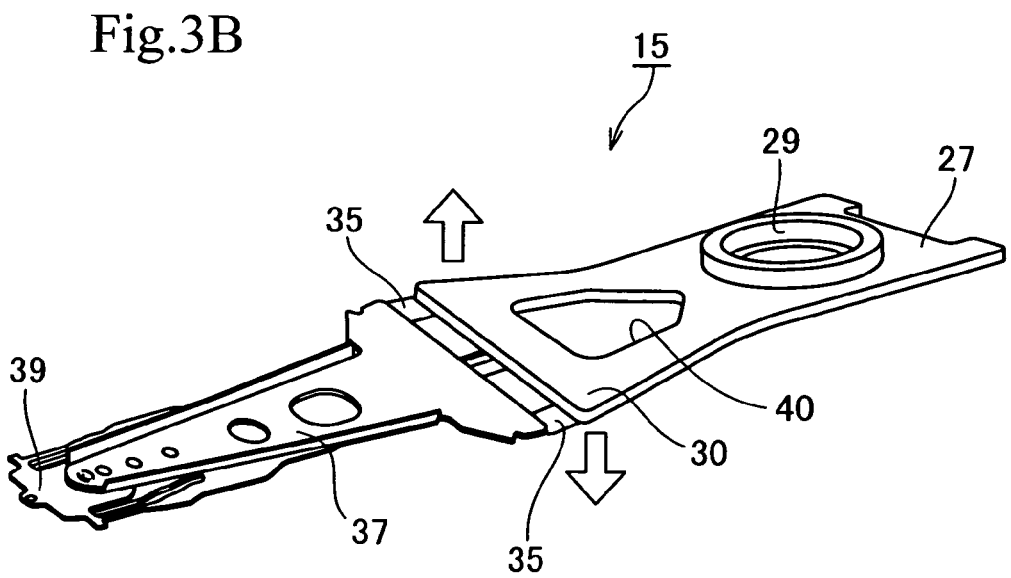

A configuration of the head suspension 15 will be explained with reference to FIGS. 3A and 3B in which FIG. 3A is a perspective view illustrating the head suspension 15 before twisted and FIG. 3B is a perspective view illustrating the head suspension 15 after twisted.

The head suspension 15 is used to write and read data to and from the recording disk 33 such as a 2.5-inch hard disk. The head suspension 15 includes the base plate 27 and a load beam 37 that is fixed through a load bend 35 to the base plate 27. A flexure 39 is fixed to a front end of the load beam 37 by laser spot welding, to support the slider 25.

In front of the boss 29 on the base plate 27, an opening 40 is formed to reduce the weight of the head suspension 15.

The base end of the load beam 37 is fixed through the load bend 35 to the front end 30 of the base plate 27 by laser spot welding. The free end of the load beam 37 is provided with the flexure 39 having the slider 25. The load beam 37 is made of a precision thin plate spring to apply load onto the slider 25. The material of the load beam 37 is, for example, austenite-based stainless steel such as SUS304 and SUS305 (Japanese Industrial Standard) shaped into a plate of several tens of micrometers to about 100 micrometers in thickness.

The flexure 39 attached to the front end of the load beam 37 resiliently supports the slider 25. The flexure 39 is formed by etching or punching a stainless steel thin plate into a predetermined shape.

The load bend 35 creates proper load on the slider 25. The load bend 35 is formed by uniformly bend a material in a pitch direction during a punch press process in a manufacturing stage of the head suspension 15. The load bend 35 consists of, for example, a pair of legs that connect the base plate 27 and load beam 37 to each other. The load bend 35 may be thinned, if necessary. The load bend 35 and load beam 37 may be integral with each other, or may be different from each other. For example, the load bend 35 may be formed together with the rigid load beam 37. Alternatively, the load bend 35 may separately be formed and fixed to the load beam 37 by spot welding.

Head suspension manufacturing methods according to embodiments of the present invention will be explained.

Figure 4A:
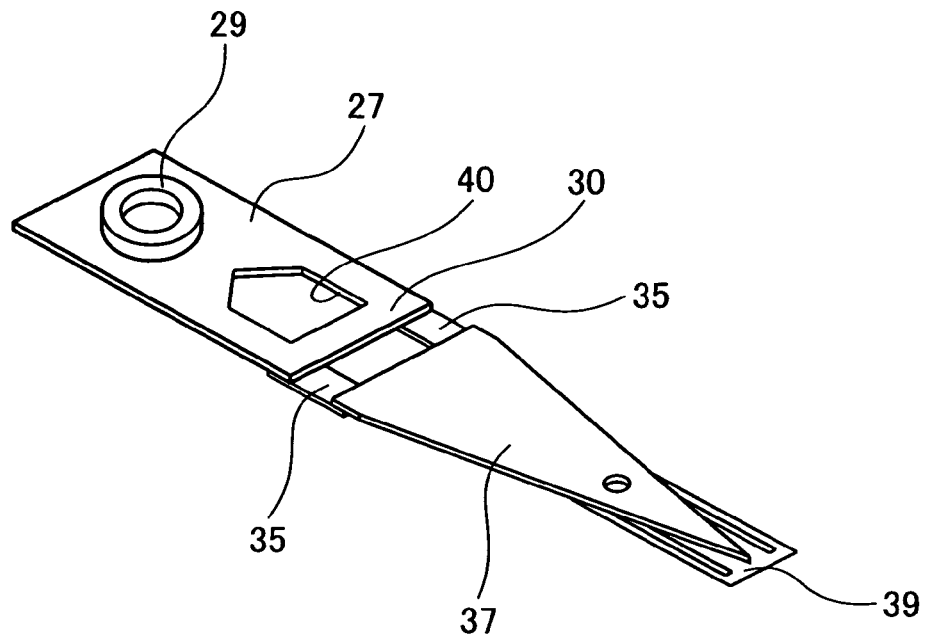
Figure 4B:
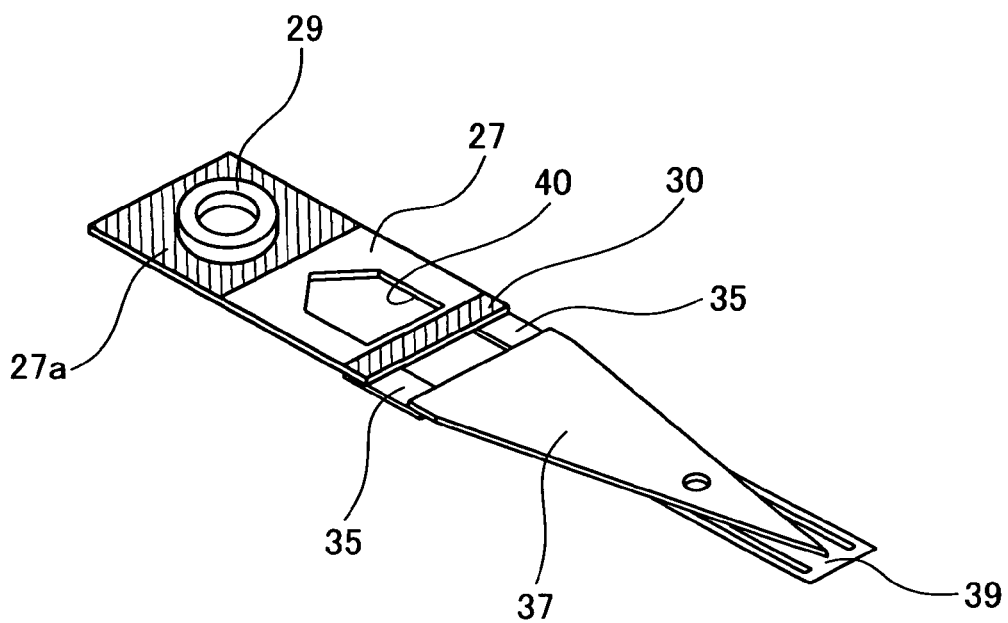
Figure 5:
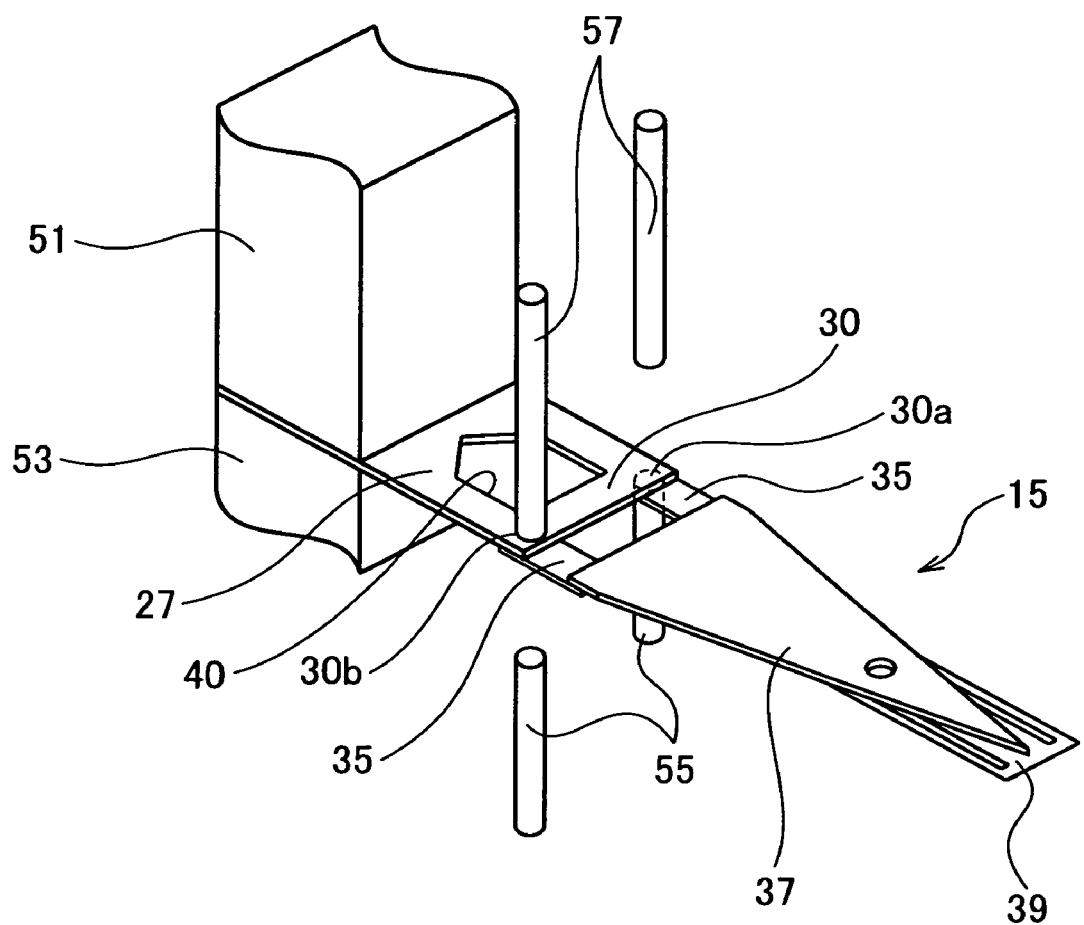
FIG. 5 is a view illustrating a method of manufacturing a head suspension according to Embodiment 1 of the present invention.

FIG. 4A illustrates a head suspension before twisted according to the present invention and FIG. 4B illustrates clamp areas (hatched areas) on the head suspension to be twisted. FIG. 5 illustrates a head suspension manufacturing method according to Embodiment 1 of the present invention and FIG. 6 illustrates a head suspension manufacturing method according to Embodiment 2 of the present invention.

The head suspension 15 illustrated in FIGS. 4A and 4B consists of a base plate 27, a load bend 35, a load beam 37, and a flexure 39 that have already been processed and assembled. Namely, the head suspension 15 is a finished product in a conventional sense. On such a head suspension 15, the present invention carries out a twisting process to twist a front end 30 of the base plate 27 so that the front end 30 inclines toward one of the inner and outer circumferences of a recording medium 33 when installed in a hard disk drive that incorporates the recording medium 33 (FIG. 1). The present invention carries out the twisting process before attaching the head suspension 15 to a carriage arm 13 (FIG. 2) by squeezing.

In FIG. 5, Embodiment 1 of the present invention carries out the twisting process by clamping a rear end (the hatched area 27a in FIG. 4B) around a boss 29 of the base plate 27 with jigs 51 and 53, by supporting a shoulder 30a of the front end 30 of the base plate 27 with one of cylindrical supports 55 having different heights from below the shoulder 30a, and by pressing another shoulder 30b of the front end 30 with one of cylindrical pressers 57 having different heights from above the shoulder 30b.

Figure 6:
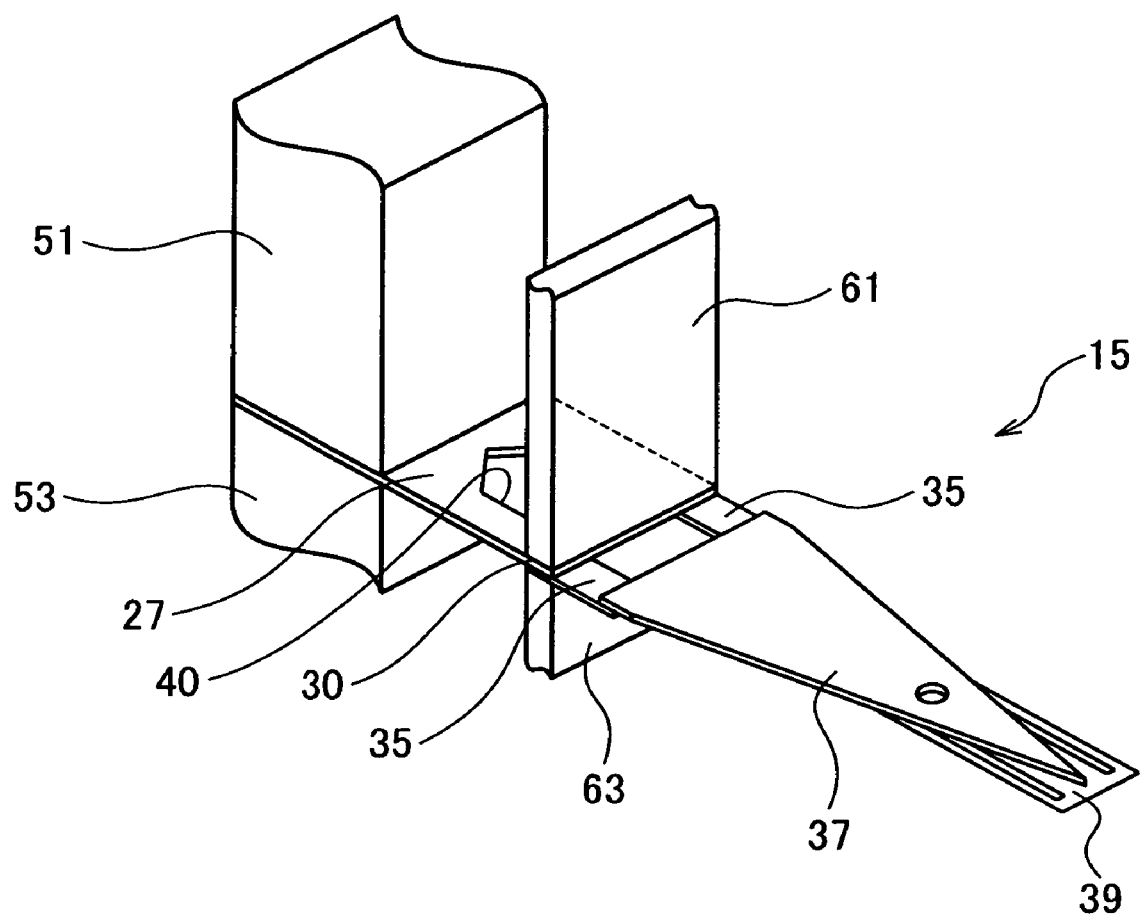
FIG. 6 is a view illustrating a method of manufacturing a head suspension according to Embodiment 2 of the present invention.

In FIG. 6, Embodiment 2 of the present invention carries out the twisting process by clamping the rear end (the hatched area 27a in FIG. 4B) around the boss 29 of the base plate 27 with jigs 51 and 53, by setting the front end 30 (the hatched area 30 in FIG. 4B) of the base plate 27 between a punch 61 and a die 63 having corresponding slopes, and by pressing the front end 30 with the punch 61 and die 63.

Effect of the present invention will be explained. In FIG. 3B, the front end 30 of the base plate 27 is inclined toward one of the inner and outer circumferences of the recording medium 30. Due to this, a part of the head suspension 15 in front of the front end 30 of the base plate 27 inclines according to a twisted angle (preferably in the range of 0.05 to 1.00 degrees) of the front end 30. As a result, a bend/vibration direction between the carriage and the head suspension 15 inclines according to the twisted angle with respect to a normal extended from the recording surface of the recording medium 33. This reduces a peak value of off-track displacement of the slider 25 that is determined by a skew angle and a bend/vibration direction, thereby securing a slider positioning accuracy.

In connection with a skew angle in a standard hard disk drive, inclining the front end 30 of the base plate 27 toward the outer circumference of the recording medium 33 results in improving the off-track preventive effect. Depending on an arrangement of the slider 25 and the specific vibration characteristic of the arm assembly 11, inclining the front end 30 of the base plate 27 toward the inner circumference of the recording medium 33 improves the off-track preventive effect. In this case, it is preferable to incline the front end 30 of the base plate 27 toward the inner circumference of the recording medium 33.

The twisting process is carried out on the front end 30 of the base plate 27, and therefore, even a multi-arm assembly employing a plurality of head suspensions is easily manufacturable because the twisting process is carried out without regard to the presence of arms of the multi-arm assembly.

Accordingly, the present invention simply and smoothly manufactures a multi-arm assembly provided with a plurality of head suspensions each suppressing off-track errors.

The present invention carries out the twisting process after assembling the head suspension 15 and before attaching the head suspension 15 to a carriage. Namely, the twisting process of twisting the front end 30 of the base plate 27 is carried out on the head suspension 15 that has been finished through required processes including a load bending process. This secures stabilized spring load for the head suspension 15.

According to the present invention, the twisting process is carried out on the head suspension 15 alone. This makes it easy to control a twisting angle.

According to Embodiment 2 of the present invention, the twisting process is carried out by clamping a rear end around the boss 29 of the base plate 27 with the jigs 51 and 53, by setting the front end 30 of the base plate 27 between the punch 61 and die 63 having corresponding slopes, and by pressing the front end 30 with the punch 61 and die 63.

The front end 30 of the base plate 27 includes spots where the base plate 27 and load beam 37 (load bend 35) are welded together by laser spot welding. Such spots involve thermal deformations due to the laser spot welding. The pressing work with the punch 61 and die 63 is effective to correct such thermal deformations.

The head suspension 15 manufactured according to any one of the embodiments of the present invention is capable of effectively suppressing off-track errors and realizing a hard disk drive having excellent data accessing characteristics.

The present invention is not limited to the above-mentioned embodiments. The embodiments may be modified within the scope of the present invention specified in the specification and claims without departing from the spirit of the present invention. Methods of manufacturing head suspensions and head suspensions themselves based on such modifications also fall in the scope of the present invention.

For example, instead of twisting the front end 30 of the base plate 27 so that the front end 30 inclines toward one of the inner and outer circumferences of the recording medium 33, the front end 30 of the base plate 27 may be twisted once toward the inner circumference of the recording medium 33 and then oppositely twisted so that the front end 30 inclines toward one of the inner and outer circumferences of the recording medium 33.

What is claimed is:

1. A method of manufacturing a head suspension for use with a carriage and disk drive, wherein a base plate is manufactured, the base plate having a front end and a rear end, the manufactured head suspension including the manufactured base plate, a load beam whose base end is attached to the front end of the base plate, a flexure attached to a front end of the load beam, and a slider resiliently supported by the flexure so that the slider receives load from the load beam and floats above a disk-like recording medium when the recording medium is rotated in the disk drive in which the carriage and head suspension are installed, the manufactured base plate being attached to the carriage, the method comprising:
 clamping the rear end of the base plate; and
 twisting the front end of the base plate by applying a load onto the front end so that the front end of the manufactured base plate inclines toward one of inner and outer circumferences of the disk-like recording medium.

2. The method of claim 1, wherein:
 twisting the front end of the base plate is carried out after assembling the head suspension and before attaching the head suspension to the carriage.

3. The method of claim 1, wherein twisting the front end of the base plate includes:
 fixing a rear end of the base plate with a jig;
 supporting a first shoulder of the front end of the base plate with a support member from below the first shoulder; and
 pressing a second shoulder of the front end of the base plate with a press member from above the second shoulder.

4. The method of claim 1, wherein twisting the front end of the base plate includes:
 fixing a rear end of the base plate with a jig;
 setting the front end of the base plate between an inclined face of a punch and an inclined face of a die, the inclined faces of the punch and die corresponding to each other; and
 pressing the front end of the base plate with the punch and die.

5. The method of claim 1, wherein:
 twisting the front end of the base plate twists the front end of the base plate at a twist angle in the range of 0.05 to 1.00 degrees.

6. A head suspension manufactured according to the method of claim 1.

7. A head suspension comprising:
 a base plate having a front end and a rear end, and being attached to a carriage;
 a load beam whose base end is attached to the front end of the base plate;
 a flexure attached to a front end of the load beam; and
 a slider resiliently supported by the flexure so that the slider receives load from the load beam and floats above a disk-like recording medium when the recording medium is rotated in a disk drive in which the carriage and head suspension are installed,
 the front end of the base plate having a twisted deformation with respect to the rear end of the base plate, and inclining toward one of inner and outer circumferences of the disk-like recording medium, so that the head suspension bends and vibrates in a direction inclined in a radial direction of the disk-like recording medium with respect to a normal extended from a recording surface of the disk-like recording medium.

8. A multi-arm assembly for a disk drive, comprising:
 a plurality of arm members; and
 a plurality of head suspensions, each one head suspension of the plurality of head suspensions being attached to a front end of a respective arm member among the plurality of arm members;
 wherein each one head suspension comprises:
 a base plate having a front end and a rear end, the rear end being attached to said respective arm member;
 a load beam whose base end is attached to the front end of the base plate;
 a flexure attached to a front end of the load beam; and
 a slider resiliently supported by the flexure so that the slider receives load from the load beam and floats above a disk-like recording medium when the recording medium is rotated in a disk drive in which the multi-arm assembly is installed; and
 wherein the front end of the base plate has a twisted deformation with respect to the rear end of the base plate, and inclines toward one of inner and outer circumferences of the disk-like recording medium, so that said one head suspension bends and vibrates in a direction inclined in a radial direction of the disk-like recording medium with respect to a normal extended from a recording surface of the disk-like recording medium.

* * * * *